(12) United States Patent
Fukuta et al.

(10) Patent No.: US 9,877,351 B2
(45) Date of Patent: Jan. 23, 2018

(54) MOBILE COMMUNICATION SYSTEM, USER TERMINAL, AND BASE STATION

(71) Applicant: KYOCERA CORPORATION, Kyoto (JP)

(72) Inventors: Noriyoshi Fukuta, Yokohama (JP); Henry Chang, San Diego, CA (US); Amit Kalhan, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/761,886

(22) PCT Filed: Jan. 17, 2014

(86) PCT No.: PCT/JP2014/050840
§ 371 (c)(1),
(2) Date: Jul. 17, 2015

(87) PCT Pub. No.: WO2014/112597
PCT Pub. Date: Jul. 24, 2014

(65) Prior Publication Data
US 2015/0341977 A1 Nov. 26, 2015

Related U.S. Application Data

(60) Provisional application No. 61/754,117, filed on Jan. 18, 2013.

(51) Int. Cl.
*H04W 4/00* (2009.01)
*H04W 76/02* (2009.01)
(Continued)

(52) U.S. Cl.
CPC ......... *H04W 76/025* (2013.01); *H04L 5/0032* (2013.01); *H04W 16/32* (2013.01);
(Continued)

(58) Field of Classification Search
None
See application file for complete search history.

(56) References Cited

U.S. PATENT DOCUMENTS 8,817,747 B2 8/2014 Wong
2010/0210268 A1* 8/2010 Lim ..................... H04W 36/04
455/436

(Continued)

FOREIGN PATENT DOCUMENTS

JP 2013-502119 A 1/2013
WO 2013/005855 A1 1/2013

OTHER PUBLICATIONS

International Search Report, PCT/JP2014/050840, dated Mar. 25, 2014.
(Continued)

*Primary Examiner* — Jutai Kao
(74) *Attorney, Agent, or Firm* — Studebaker & Brackett PC

(57) ABSTRACT

A mobile communication system supports a dual connectivity scheme. The dual connectivity scheme is a scheme in which a user terminal establishes a pair of connections with a pair of cells including a combination of cells managed by different base stations. The user terminal is permitted to apply the dual connectivity scheme only when the pair of cells is a combination of a large cell and a small cell provided within a coverage of the large cell.

2 Claims, 5 Drawing Sheets

(51) Int. Cl.
*H04L 5/00* (2006.01)
*H04W 72/04* (2009.01)
*H04W 48/16* (2009.01)
*H04W 48/20* (2009.01)
*H04W 48/02* (2009.01)
*H04W 16/32* (2009.01)
*H04W 28/08* (2009.01)
*H04W 72/12* (2009.01)

(52) U.S. Cl.
CPC .......... *H04W 28/08* (2013.01); *H04W 48/02* (2013.01); *H04W 48/16* (2013.01); *H04W 48/20* (2013.01); *H04W 72/048* (2013.01); *H04W 72/0426* (2013.01); *H04L 5/001* (2013.01); *H04L 5/0035* (2013.01); *H04W 72/12* (2013.01)

(56) References Cited

U.S. PATENT DOCUMENTS

| | | | | |
|---|---|---|---|---|
| 2012/0039226 A1* | 2/2012 | Yang | ................ | H04W 52/0277 370/311 |
| 2014/0092785 A1* | 4/2014 | Song | ................ | H04L 1/00 370/280 |
| 2015/0230236 A1* | 8/2015 | Zeng | ................ | H04L 41/0806 370/329 |
| 2015/0365984 A1* | 12/2015 | Lee | ................ | H04W 76/02 370/329 |
| 2017/0111928 A1* | 4/2017 | Song | ................ | H04W 72/14 |

OTHER PUBLICATIONS

Written Opinion of the International Searching Authority, PCT/JP2014/050840, dated Mar. 25, 2014.

3GPP TSG RAN WGI Meeting#72, Evaluation assumptions for inter-site CA, R1-130175, St Julian's, Malta, Jan. 28-Feb. 1, 2013.

3GPP TSG-RAN Meeting#58, New Study Item Description: Small Cell enhancements for E-UTRA and E-UTRAN—Higher-layer aspects, RP-122033, Barcelona, Spain, Dec. 4-7, 2012.

3GPP TSG-RAN WG2 Meeting #81, User data rate enhancements with inter-site CA, R2-130124, Malta, Jan. 28-Feb. 1, 2013.

Ericsson, "Views on Rel-12, 3GPP RWS-120003," Jun. 12, 2012, 22 pp.

JP Office Action dated Oct. 18, 2016 from corresponding JP Appl No. 2014-557514 with concise statement of relevance, 4 pp.

* cited by examiner

MOBILE COMMUNICATION SYSTEM, USER TERMINAL, AND BASE STATION

FIELD OF THE INVENTION

The present invention relates to a mobile communication system that supports a dual connectivity scheme.

RELATED ART

In 3GPP (3rd Generation Partnership Project) which is a project aiming to standardize a mobile communication system, introduction of a dual connectivity (dual connection) scheme has been discussed (see Non-patent document 1).

The dual connectivity scheme is a scheme in which a user terminal establishes a pair of connections with a pair of cells, i.e., a combination of cells managed by different base stations.

PRIOR ART DOCUMENT

Non-patent Document

[Non-patent Document 1] 3GPP Contribution RP-122033

SUMMARY OF THE INVENTION

A dual connectivity scheme, while having a variety of advantages, requires that one user terminal simultaneously communicates with a plurality of cells.

Accordingly, there is a problem of incurring complication of communication control if the dual connectivity scheme is unconditionally permitted.

Therefore, an object of the present invention is to provide a mobile communication system capable of taking advantage of the dual connectivity scheme while restraining complication of communication control.

A mobile communication system according to an embodiment supports a dual connectivity scheme. The dual connectivity scheme is a scheme in which a user terminal establishes a pair of connections with a pair of cells including a combination of cells managed by different base stations. The user terminal is permitted to apply the dual connectivity scheme only when the pair of cells is a combination of a large cell and a small cell provided within a coverage of the large cell.

DESCRIPTION OF THE EMBODIMENTS

[Overview of Embodiments]

A mobile communication system according to an embodiment supports a dual connectivity scheme. The dual connectivity scheme is a scheme in which a user terminal establishes a pair of connections with a pair of cells including a combination of cells managed by different base stations. The user terminal is permitted to apply the dual connectivity scheme only when the pair of cells is a combination of a large cell and a small cell provided within a coverage of the large cell.

In the embodiment, the user terminal is permitted to apply the dual connectivity scheme only when the pair of cells is a combination of the large cell belonging to a first frequency and the small cell belonging to a second frequency that is different from the first frequency.

In the embodiment, the user terminal, in an idle state, selects the large cell as a serving cell in preference to the small cell.

In the embodiment, in the dual connectivity scheme, a first base station managing the large cell includes a first scheduler, and a second base station managing the small cell includes a second scheduler. Each of the first scheduler and the second scheduler performs resource assignment to the user terminal.

A user terminal according to the embodiment supports a dual connectivity scheme. The dual connectivity scheme is a scheme in which the user terminal establishes a pair of connections with a pair of cells including a combination of cells managed by different base stations. The user terminal is permitted to apply the dual connectivity scheme only when the pair of cells is a combination of a large cell and a small cell provided within a coverage of the large cell.

A base station according to the embodiment is a base station in a mobile communication system that supports a dual connectivity scheme. The dual connectivity scheme is a scheme in which a user terminal establishes a pair of connections with a pair of cells including a combination of cells managed by different base stations. The base station comprises a control unit that permits the user terminal to apply the dual connectivity scheme only when the pair of cells is a combination of a large cell and a small cell provided within the coverage of the large cell.

[Embodiment]

With reference to the drawings, an embodiment in a case where a dual connectivity scheme is introduced to an LTE system that is a mobile communication system configured in accordance with 3GPP standard will be described, below.

(System Configuration)

Figure 1:
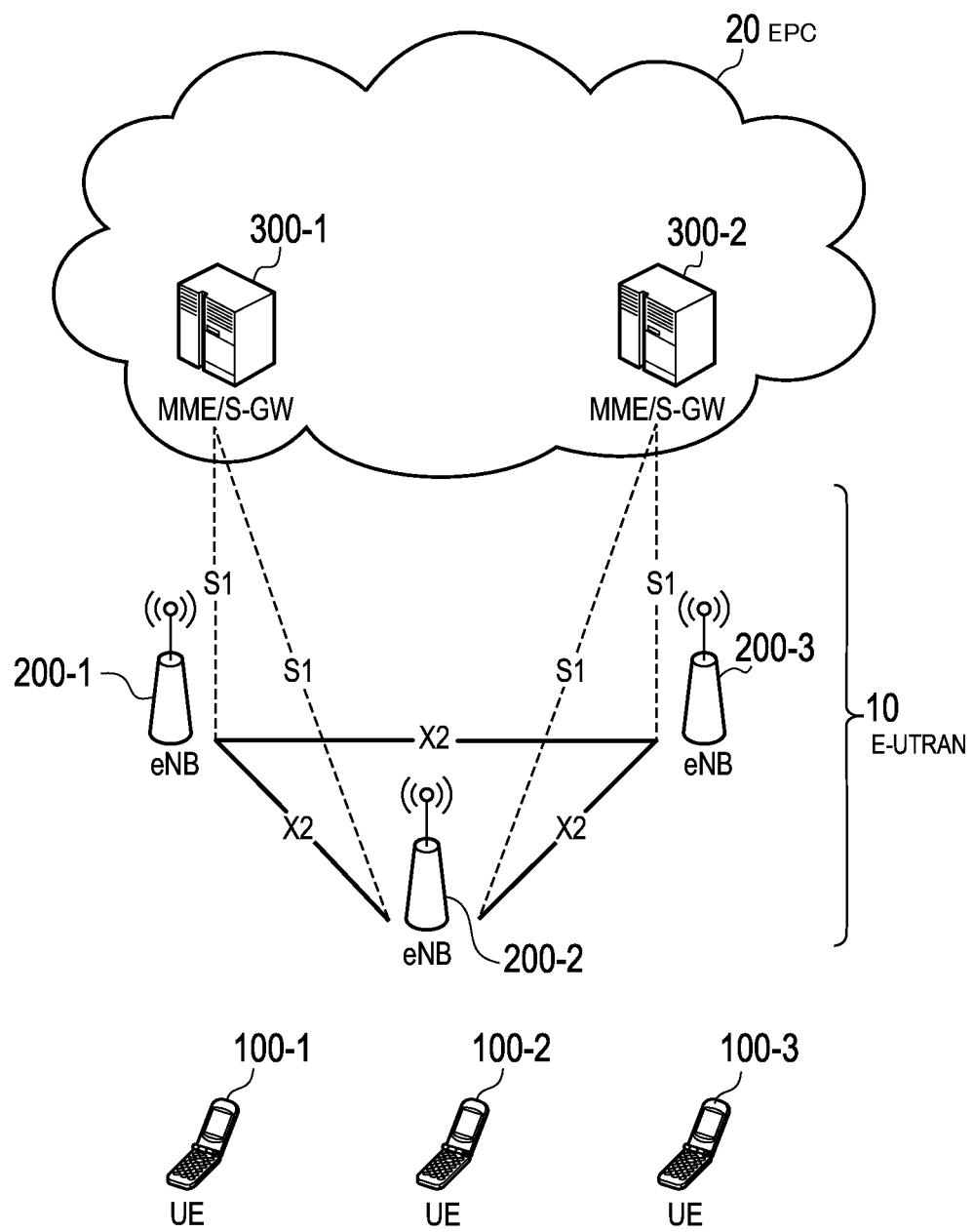
FIG. 1 is a configuration diagram of an LTE system according to an embodiment.

FIG. 1 is a configuration diagram of an LTE system according to the present embodiment. As illustrated in FIG. 1, the LTE system includes a plurality of UEs (User Equipments) 100, E-UTRAN (Evolved-UMTS Terrestrial Radio Access Network) 10, and EPC (Evolved Packet Core) 20. The E-UTRAN 10 corresponds to a radio access network. The EPC 20 corresponds to a core network.

The UE 100 is a mobile radio communication device and performs radio communication with a cell with which a connection is established. The UE 100 corresponds to a user terminal. As the UE 100 moves, the UE 100 in a connected state switches serving cells. Further, as the UE 100 moves, the UE 100 in an idle state switches serving cells. Switching the serving cells is referred to as handover for the connected state and cell reselection for the idle state.

The E-UTRAN 10 includes a plurality of eNBs 200 (evolved Node-Bs). The eNB 200 corresponds to a base station. The eNB 200 constitutes one or a plurality of cells and performs radio communication with the UE 100 which establishes a connection with the cell of the eNB 200. It is noted that the "cell" is used as a term indicating a minimum unit of a radio communication area, and is also used as a term indicating a function of performing radio communication with the UE 100. The eNB 200, for example, has a radio resource management (RRM) function, a routing function of user data, and a measurement control function for mobility control and scheduling.

The eNBs 200 are connected mutually via an X2 interface. Further, the eNB 200 is connected with MME/S-GW 300 included in the EPC 20 via an S1 interface.

The EPC 20 includes a plurality of MMEs (Mobility Management Entity)/S-GWs (Serving-Gateways) 300. The MME is a network node for performing various mobility controls and the like for the UE 100 and corresponds to a control station. The S-GW is a network node that performs transfer control of user data and corresponds to a switching station.

Next, the configurations of the UE 100 and the eNB 200 will be described.

Figure 2:
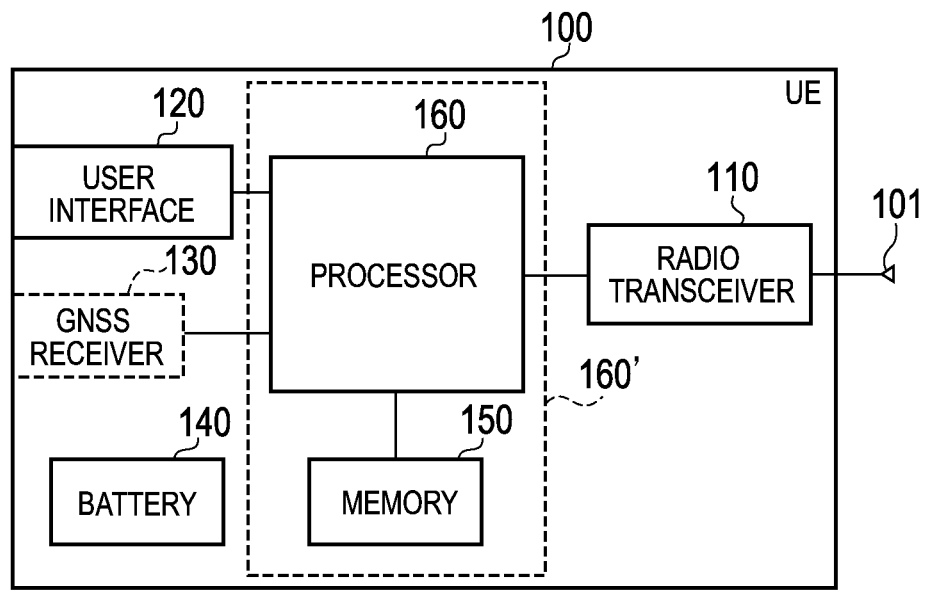
FIG. 2 is a block diagram of UE according to the embodiment.

FIG. 2 is a block diagram of the UE 100. As illustrated in FIG. 2, the UE 100 includes an antenna 101, a radio transceiver 110, a user interface 120, a GNSS (Global Navigation Satellite System) receiver 130, a battery 140, a memory 150, and a processor 160. The memory 150 and the processor 160 constitute a control unit. The UE 100 may not have the GNSS receiver 130. Furthermore, the memory 150 may be integrally formed with the processor 160, and this set (that is, a chipset) may be called a processor 160'.

The antenna 101 and the radio transceiver 110 are used to transmit and receive a radio signal. The antenna 101 includes a plurality of antenna elements. The radio transceiver 110 converts a baseband signal output from the processor 160 into the radio signal, and transmits the radio signal from the antenna 101. Furthermore, the radio transceiver 110 converts the radio signal received by the antenna 101 into the baseband signal, and outputs the baseband signal to the processor 160.

The user interface 120 is an interface with a user carrying the UE 100, and includes, a display, a microphone, a speaker, and various buttons and the like. The user interface 120 receives an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for a process by the processor 160. The processor 160 includes a baseband processor that performs modulation and demodulation, encoding and decoding and the like of the baseband signal, and a CPU (Central Processing Unit) that performs various processes by executing the program stored in the memory 150. The processor 160 may further include a codec that performs encoding and decoding of sound and video signals. The processor 160 executes various processes and various communication protocols described later.

Figure 3:
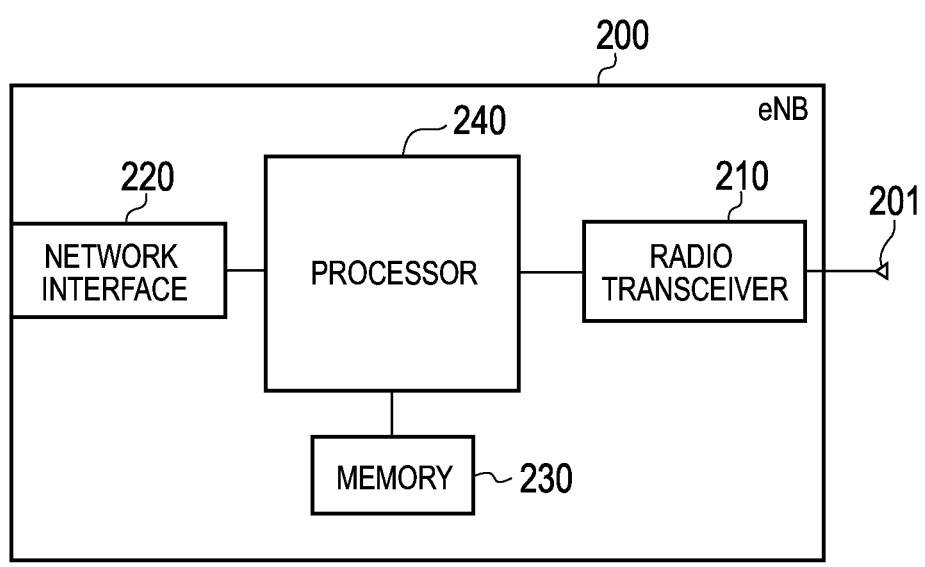
FIG. 3 is a block diagram of eNB according to the embodiment.

FIG. 3 is a block diagram of the eNB 200. As illustrated in FIG. 3, the eNB 200 includes an antenna 201, a radio transceiver 210, a network interface 220, a memory 230, and a processor 240. The memory 230 and the processor 240 constitute a control unit.

The antenna 201 and the radio transceiver 210 are used to transmit and receive a radio signal. The antenna 201 includes a plurality of antenna elements. The radio transceiver 210 converts the baseband signal output from the processor 240 into the radio signal, and transmits the radio signal from the antenna 201. Furthermore, the radio transceiver 210 converts the radio signal received by the antenna 201 into the baseband signal, and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240. The processor 240 includes the baseband processor that performs modulation and demodulation, and encoding and decoding and the like of the baseband signal and a CPU that performs various processes by executing the program stored in the memory 230. The processor 240 executes various processes and various communication protocols described later.

Figure 4:
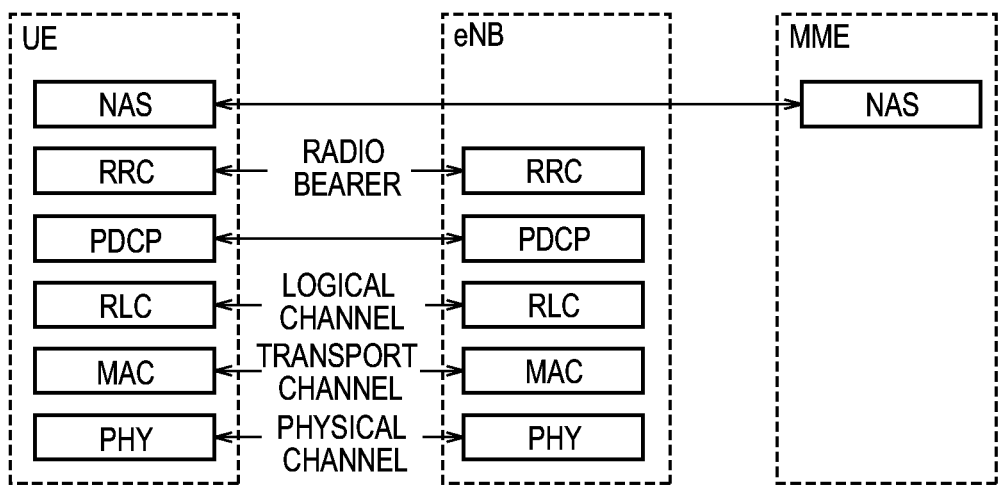
FIG. 4 is a protocol stack diagram of a radio interface in the LTE system.

FIG. 4 is a protocol stack diagram of a radio interface in the LTE system. As illustrated in FIG. 4, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data is transmitted via the physical channel.

The MAC layer performs preferential control of data, and a retransmission process and the like by hybrid ARQ (HARQ). Between the MAC layer of the UE 100 and the MAC layer of the eNB 200, data is transmitted via a transport channel. The MAC layer of the eNB 200 includes a scheduler for determining a transport format (a transport block size, a modulation and coding scheme and the like) of an uplink and a downlink, and an assigned resource block.

The RLC layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control message (an RRC message) for various types of setting is transmitted. The RRC layer controls the logical channel, the transport channel, and the physical channel in response to establishment, re-establishment, and release of a radio bearer. When there is a connection (RRC connection) between the RRC of the UE 100 and the RRC of the eNB 200, the UE 100 is in a connected state (RRC connected state), otherwise, the UE 100 is in an idle state (RRC idle state).

A NAS (Non-Access Stratum) layer positioned above the RRC layer performs session management or mobility management and the like.

Figure 5:
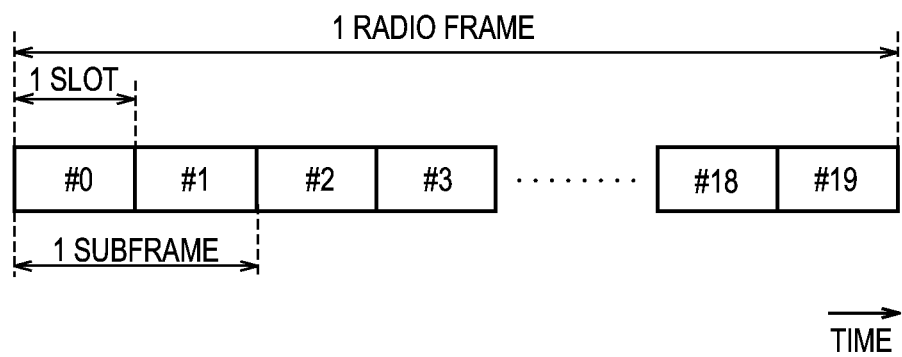
FIG. 5 is a configuration diagram of a radio frame used in the LTE system.

FIG. 5 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As illustrated in FIG. 5, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. The resource block includes a plurality of subcarriers in the frequency direction.

Among radio resources assigned to the UE 100, a frequency resource can be designated by a resource block and a time resource can be designated by a subframe (or slot).

In the downlink, an interval of several symbols at the head of each subframe is a control region mainly used as a physical downlink control channel (PDCCH). Furthermore, the remaining interval of each subframe is a region that can be mainly used as a physical downlink shared channel (PDSCH). Furthermore, in the downlink, reference signals such as cell-specific reference signals are distributed and arranged in each subframe.

In the uplink, both ends, in the frequency direction, of each subframe are control regions mainly used as a physical uplink control channel (PUCCH). Furthermore, the center portion, in the frequency direction, of each subframe is a region that can be mainly used as a physical uplink shared channel (PUSCH).

(Operation According to Embodiment)

Figure 6:
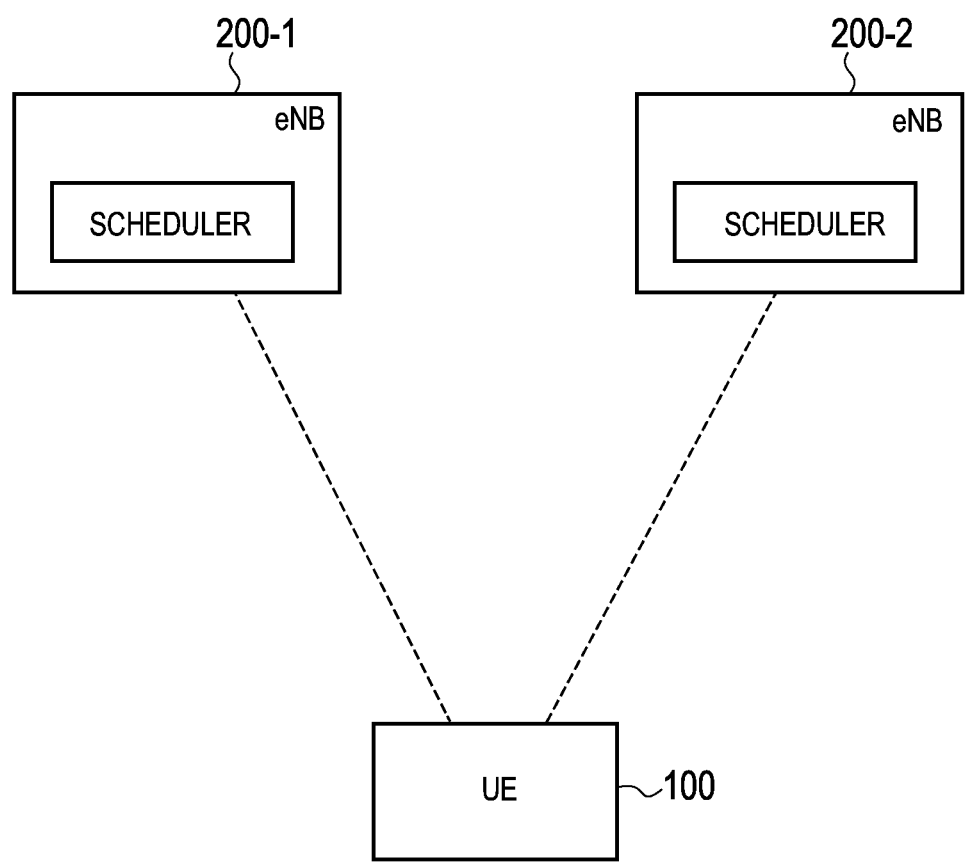
FIG. 6 is a diagram for illustrating a dual connectivity scheme according to the embodiment.

Next, an operation according to the present embodiment will be described. The LTE system according to the present embodiment supports a dual connectivity scheme. FIG. 6 is a diagram for illustrating the dual connectivity scheme.

As illustrated in FIG. 6, the dual connectivity scheme is a scheme in which a pair of cells including a combination of cells managed by different eNBs 200 (eNB 200-1 and eNB 200-2) and the UE 100 establish a pair of connections. Therefore, each of the cells of the eNB 200-1 and the cell of the eNB 200-2 can be regarded as a serving cell of the UE 100. The eNB 200-1 includes a first scheduler while the eNB 200-2 includes a second scheduler. Each of the first scheduler and the second scheduler performs resource assignment (resource block assignment, and the like) for the UE 100.

According to such a dual connectivity scheme, the UE 100 is assigned with a radio resource from each cell constituting a pair of cells, thus throughput can be improved.

In the present embodiment, the cells of the eNB 200-1 and the cell of the eNB 200-2 belong to different frequency (carrier).

In the LTE system, schemes related to the dual connectivity scheme include CoMP (Coordinated Multi-Point) and CA (Carrier Aggregation). The CoMP and the CA are similar to the dual connectivity scheme in that a plurality of cells transmit and receive data to and from the one UE 100.

However, the CoMP is different from the dual connectivity scheme in that the CoMP is applied in a case where the plurality of cells belong to the same frequency. Further, the CA is different from the dual connectivity scheme in that the same schedulers perform resource assignment in a plurality of cells.

In the aforementioned dual connectivity scheme, it is assumed that the scheduler of the eNB 200-1 and the scheduler of the eNB 200-2 operate in cooperation with each other, and as a result, communication control is complicated.

Accordingly, it is not preferable to unconditionally permit the dual connectivity scheme in consideration of restraining the complication of communication control.

Thus, in the present embodiment, the UE 100 is permitted to apply the dual connectivity scheme only when the pair of cells is a combination of a large cell and a small cell provided in the coverage of the large cell. As described later, such a combination of cells can exert an effect of the dual connectivity scheme to the fullest extent. Accordingly, by limiting to such a combination of cells, it is possible to take advantage of the dual connectivity scheme while restraining complication of communication control.

Figure 7:
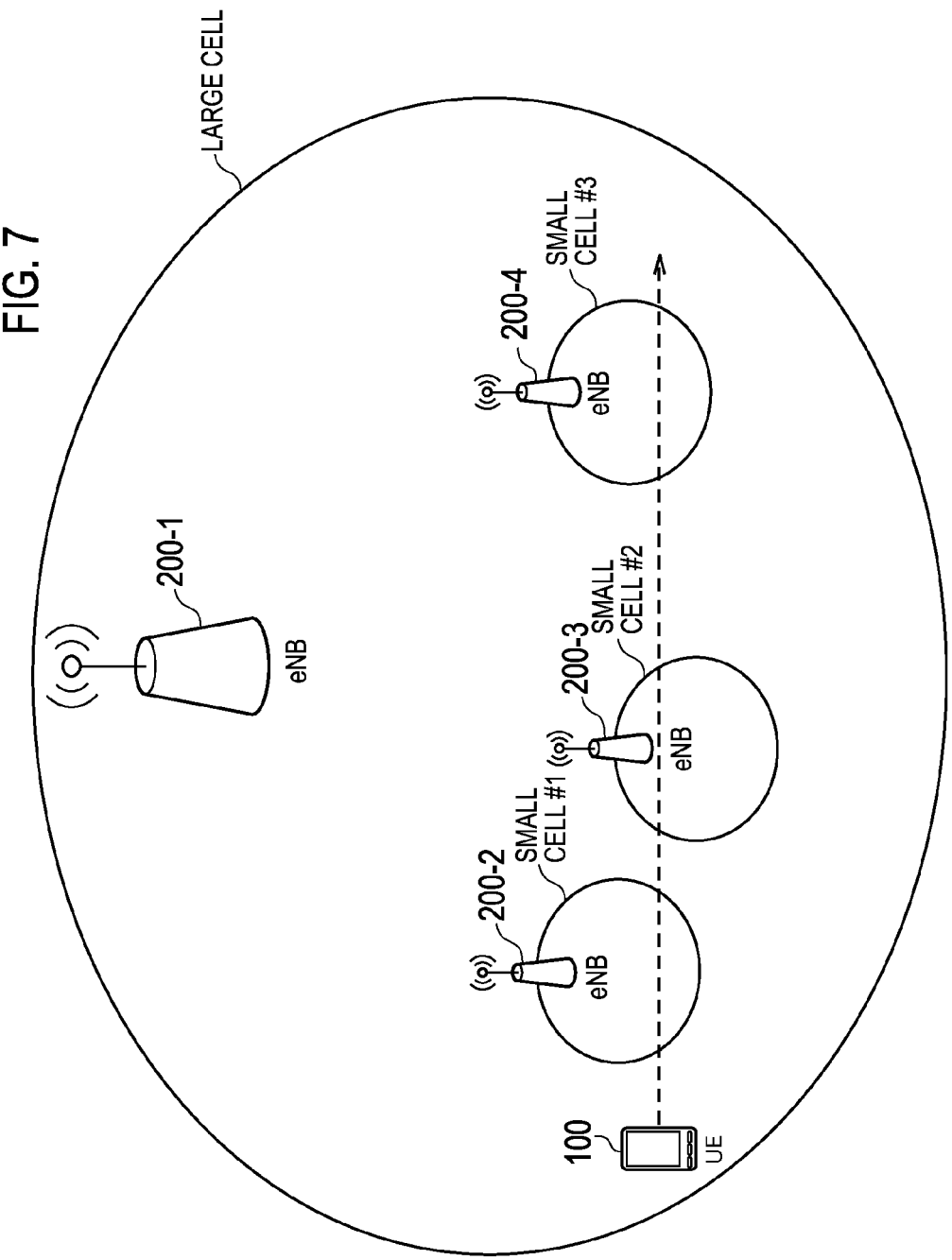
FIG. 7 is a diagram for illustrating operation according to the embodiment.

FIG. 7 is a diagram illustrating a specific example of a communication environment in which a large cell and small cells provided within the coverage of the large cell, are provided.

As illustrated in FIG. 7, the eNB 200-1 manages a large cell. The large cell is a general cell in the LTE system, and is called a macro cell.

Each of the eNB 200-2 through eNB 200-4 manages a small cell. The small cell is a cell having a smaller coverage than the large cell, and called a pico cell or a femto cell. Each of the eNB 200-2 through the eNB 200-4 may be a home base station (HeNB). The small cell is provided within the coverage of the large cell. Further, the small cell belongs to a frequency that is different from a frequency to which the large cell belongs.

The UE 100 has RRC connection established with the large cell as a serving cell. Here, a situation is assumed in which the UE 100 moves and passes through each coverage of a small cell #1 through a small cell #3. When the dual connectivity scheme is not applied, the UE 100 performs handover from the large cell to the small cell #1, followed by handover from the small cell #1 to the large cell. Then, the UE 100 performs handover from the large cell to the small cell #2, followed by handover from the small cell #2 to the large cell. Handover repeatedly occurs similarly in the small cell #3. Frequent handover in this manner increases a probability of a radio link failure due to a handover failure.

The dual connectivity scheme is applied in such a situation, thereby making it possible to restrain the radio link failure due to the handover failure. Specifically, the UE 100 and the eNB 200-1, while maintaining RRC connection between the large cell and the UE 100, perform control so that a connection (a connection so as to enable transmission and reception of data between a small cell and the UE 100) is established between the small cell and the UE 100 only during a period when the UE 100 exists within the coverage of the small cell. In this case, the large cell can be regarded as an anchor cell of the UE 100.

The eNB 200-1 determines whether the UE 100 is in a state of being connectable to the small cell, and when the UE 100 is in the state of being connectable to the small cell, the eNB 200-1 performs control so that a connection is established between the small cell and the UE 100. For example, the eNB 200-1 decides whether to apply the dual connectivity scheme on the basis of a measurement report received from the UE 100. The measurement report includes measurement information (received power of a reference signal and the like) of each of the serving cell and a neighboring cell. When measurement information about the neighboring cell is good, and a cell ID included in the measurement information is a cell ID of a small cell, the eNB 200-1 decides application of the dual connectivity scheme and performs control so as to establish a connection between the small cell and the UE 100. Alternatively, when receiving, from the UE 100, notification to the effect that the UE 100 approaches a small cell, the eNB 200-1 may decide to apply the dual connectivity scheme.

The RRC connection is maintained between the large cell and the UE 100, thereby the large cell functions as a serving cell (anchor cell) of the UE 100 at all times and can continue mobility control, thus making it possible to restrain a radio link failure. Further, when the UE 100 exists within the coverage of a small cell, the UE 100 receives assignment of resource from each of the large cell and the small cell, and thus, it is possible to improve throughput.

Note that, when the large cell and the small cell belong to the same frequency, the aforementioned CoMP is applicable, therefore it is preferable to apply the dual connectivity scheme only when the large cell and the small cell belong to different frequencies.

While the aforementioned operation is operation when the UE 100 is in a connected state, the UE 100 in an idle state can perform an operation as follows. The UE 100 in the idle state selects, by cell reselection, a cell in a good reception state, for example, as a serving cell. Here, when it is required to perform communication, the UE 100 establishes RRC connection with the selected cell (serving cell). Therefore, when the UE 100 selects a small cell as a serving cell (camps on the small cell), the UE 100 firstly establishes the RRC connection with the small cell, and thus, it is difficult to apply mobility control by the aforementioned dual connectivity scheme. Therefore, in the present embodiment, the UE 100 in the idle state selects the large cell as a serving cell in preference to the small cell. That is, the UE 100 makes setting so that priority of the large cell is higher than that of the small cell as priority in the cell reselection.

(Conclusion of Embodiment)

As described above, the dual connectivity scheme is permitted to be applied only when the pair of cells a combination of a large cell and a small cell provided within the coverage of the large cell. This makes it possible to take advantage of the dual connectivity scheme while restraining complication of communication control.

In the present embodiment, the dual connectivity scheme is permitted to be applied only when the pair of cells is a combination of a large cell and a small cell provided within the coverage of the large cell, and the large cell and the small cell belong to different frequencies. This makes it possible to take advantage of the dual connectivity scheme under a situation where the CoMP cannot be applied.

Further, in the present embodiment, the UE 100, in an idle state, selects the large cell as a serving cell in preference to a small cell. Thereby, the UE 100 firstly establishes the RRC connection with the large cell, thus making it possible to facilitate application of the dual connectivity scheme.

[Other Embodiments]

Thus, the present invention has been described with the embodiments. However, it should not be understood that those descriptions and drawings constituting a part of this disclosure limit the present invention. From this disclosure, a variety of alternate embodiments, examples, and applicable techniques will become apparent to one skilled in the art.

For example, the aforementioned embodiments have described an example in which the present invention is applied to the LTE system. However, the present invention is not limited to the LTE system and may also be applied to systems other than the LTE system.

Supplementary notes of the aforementioned embodiment will be described below.

Small Cell Discovery

Scenarios, metrics and requirements for Small Cell enhancements for E-UTRA and E-UTRAN is to identify and to evaluate the necessity of overall Radio Resource Management structure and mobility enhancements for small cell deployments. Studies of potential enhancements which are addressed by HetNet Mobility work item are out of scope. One area that requires further evaluation is the need for cell identification enhancements while minimizing increased UE battery consumption. One target for small cell enhancement is to improve network energy efficiency. Small cells in a dormant mode have been considered for network energy saving for the case when small cells not serving any active users. Depending on the dormant mode design, it's assumed small cells in a dormant mode may cause unexpected impacts for cell discovery. If small cell is undetected or the detection is delayed, UE may lose opportunities to achieve better user throughput/capacity and QoS. Also higher UE energy efficiency can be achieved with effective small cell discovery, which is a target of this study item, since NW can configure an effective measurement configuration based on small cell discovery. It's obvious that the impact to UE power consumption depends on how often and for how long a UE performs inter-frequency measurements. Therefore, discovery of small cell of non-energy efficient cells or legacy cells have been addressed in e.g., HetNet Mobility; however, discovery of energy efficient small cells that may be dormant is an entirely different challenge and enhancement for discovery of this type of cells should be considered.

Proposal 1: discovery mechanism for energy efficient small cell should be studied.

Dual Connectivity

Necessity for Dual Connectivity

Another object of this study item is to identify and evaluate the benefits of UEs having dual connectivity to macro and small cell layers served by different or same carrier and for which scenarios such dual connectivity is feasible and beneficial. Therefore, the scenarios, where dual connectivity is beneficial, should be considered at first. The desired scenarios are the one not handled by the existing mechanisms. Considering the small cell's short range transmission path, if UE only has a connection to Small Cell a large number of HO/re-direction would occur. Furthermore, Small cell enhancement should target both with and without macro coverage, both outdoor and indoor small cell deployments and both sparse and dense small cell deployments should be considered. Therefore, increased number of radio link failures may occur if the UE is only allowed to connect to small cells. To provide better mobility robustness, allowing the UE to connect to both small cell and macrocell simultaneously should be considered. Some new structures using dual connectivity such as supporting C-plane and U-plane in different nodes, termination of different protocol layers should be studied. The complexity of supporting such a feature should be taken into account as part of the decision to adopt dual connectivity.

The main advantage of having dual connectivity is to allow the UE to be served by two cells simultaneously thereby improving the user experience by offering more useable BWs as well as by providing mobility enhancements for small cell deployments. The basic goal is not too different from what is already discussed for CA, and CoMP. Therefore, it is necessary to consider whether all the desirable deployment options for operators are sufficiently addressed by existing mechanisms. For the case where the macrocell and the small cell are served by the same frequency, the scenario can be addressed by CoMP. Also with interference management via FeICIC, the cells can retain more of the useable resources for serving UE which in turn provides better user experience. The case for non-co-channel deployment of small cells is considered highly desirable. Therefore, the case whereby the macrocell and the small cell are supported by different frequencies should be prioritized. In CA, the Type 4 scenario with RRHs appears to have the basic tools needed to support dual connectivity since the UE is simultaneously connected to the macrocell and the small cell (RRH). However, Type 4 CA is not intended for C-plane, U-plane decoupling. And further enhancement may still be needed. Additionally, Type 4 CA does not address the general case where the small cells are not RRHs. Therefore, in general, there is currently no existing mechanism that allows the UE to be simultaneously served by two non-co-channel cells belonging to different eNBs.

To support the use of dual connectivity for the non-co-channel scenario, the complexity in supporting such a feature and whether it is really essential to support deployment scenarios outside the capability of CA or CoMP should be also considered. It has been identified that the backhaul latency of the small cell may not be ideal (as in the case for RRH). With higher backhaul latency, it may be necessary that each small cell will have its own scheduler. So in order to support dual connectivity, the additional complexity to coordinate the schedulers between the two cells must be carefully considered, i.e., whether the benefit for increased user experience justifies the increased complexity.

Furthermore, the need for supporting dual connectivity for both the case where the small cell is based on Legacy Carrier Type (LCT) or New Carrier Type (NCT) should be considered.

Proposal 2: dual connectivity architecture in Small Cell enhancements study item should be adopted.

Proposal 3: For dual connectivity, RAN2 should prioritize the case whereby the macrocell and the small cell are supported by different frequencies.

Proposal 4: whether dual connectivity should be applicable to either small cells with LCT or NCT or both should be considered.

Design of Dual Connectivity

Although detailed design of dual connectivity is FFS, at least macrocell should always provide mobility information when UE have dual connectivity. And cell combination candidates which dual connectivity is available should be pre-defined. If candidate cells for dual connectivity can be pre-defined, the network would have the option to exclude certain small cells with excessive backhaul latency from the dual connectivity. This allows the network to determine which small cells have acceptable backhaul latency necessary to coordinate dual connectivity.

Proposal 5: Cell combination candidates which dual connectivity is available should be pre-defined.

The entire contents of U.S. Provisional Application No. 61/754,117 (filed on Jan. 18, 2013) are incorporated herein by reference.

INDUSTRIAL APPLICABILITY

The present invention is useful for mobile communication fields.

The invention claimed is:

1. A mobile communication system that supports a dual connectivity scheme, comprising:
a user terminal;
a base station that includes a first scheduler, the base station configured to establish a radio resource control (RRC) connection with the user terminal and to perform a mobility control for the user terminal; and
a home base station that includes a second scheduler, the home base station providing the user terminal with additional radio resources, wherein
in the dual connectivity scheme, each of the first and second schedulers assigns radio resources to the user terminal,
a specific small cell to be used in combination with a cell managed by the base station, in the dual connectivity scheme, is predefined,
the base station is configured to
receive a measurement report from the user terminal, the measurement report including: a measurement result for a small cell managed by the home base station; and an identifier related to the home base station,
determine whether or not the small cell is the specific small cell, based on the measurement report, and
perform a control for establishing a connection between the user terminal and the home base station by determining to apply the dual connectivity scheme, in response to determining that the small cell is the specific small cell.

2. A base station used for a mobile communication system that supports a dual connectivity scheme, comprising:
at least one processor including a first scheduler, wherein the at least one processor is configured to establish a radio resource control (RRC) connection with a user terminal and to perform a mobility control for the user terminal, wherein
in the dual connectivity scheme, each of the first scheduler and a second scheduler assigns radio resources to the user terminal, the second scheduler included in a home base station that provides the user terminal with additional radio resources,
a specific small cell to be used in combination with a cell managed by the base station, in the dual connectivity scheme, is predefined,
the at least one processor is further configured to
receive a measurement report from the user terminal, the measurement report including: a measurement result for a small cell managed by the home base station; and an identifier related to the home base station,
determine whether or not the small cell is the specific small cell, based on the measurement report, and
perform a control for establishing a connection between the user terminal and the home base station by determining to apply the dual connectivity scheme, in response to determining that the small cell is the specific small cell.

* * * * *